United States Patent [19]
Creedon et al.

[11] Patent Number: 5,465,340
[45] Date of Patent: Nov. 7, 1995

[54] DIRECT MEMORY ACCESS CONTROLLER HANDLING EXCEPTIONS DURING TRANSFERRING MULTIPLE BYTES IN PARALLEL

[75] Inventors: Tadhg Creedon; Eugene G. O'Neill; Anne O'Connell, all of Galway, Ireland

[73] Assignee: Digital Equipment Corporation, Maynard, Mass.

[21] Appl. No.: 828,358

[22] Filed: Jan. 30, 1992

[51] Int. Cl.[6] .................................................. G06F 13/26
[52] U.S. Cl. ............................................. 395/846; 395/841
[58] Field of Search .................................. 395/275, 425; 364/242.3

[56] References Cited

U.S. PATENT DOCUMENTS

| | | | |
|---|---|---|---|
| 4,688,166 | 8/1987 | Schneider | 364/200 |
| 4,845,657 | 7/1989 | Yokota et al. | 395/275 |
| 5,185,876 | 2/1993 | Nguyen et al. | 395/425 |
| 5,295,250 | 3/1994 | Komoto et al. | 395/375 |

FOREIGN PATENT DOCUMENTS

| | | |
|---|---|---|
| 303752 | 2/1989 | European Pat. Off. . |
| 425849 | 5/1991 | European Pat. Off. . |
| 10907 | 9/1990 | WIPO . |

OTHER PUBLICATIONS

Hardware–Assisted Byte Alignment for High–Speed Digital Communications Processors; IBM Technical Disclosure Bulletin, vol. 29, No. 2, Jul. 1986, Armonk, N.Y., US pp. 864–868.

*Primary Examiner*—Reba I. Elmore
*Attorney, Agent, or Firm*—Kenyon & Kenyon

[57] ABSTRACT

A direct memory access controller (DMAC) is provided to transfer bytes from arbitrary offset byte boundaries while performing data check operations in parallel to the movement of data in parallel through the DMA controller. The DMA controller moves data during each memory cycle and validates the moved data at the destination memory during the writing of bytes to the destination address.

8 Claims, 9 Drawing Sheets

| JKLM | GNIJ | KL |
|---|---|---|
| READ | WRITE | WRITE |
| | | |
| | JKLM | |
| GHIF | GHIJ | KLIS |
| ↓↓↓ | ↓↓↓↓ | ↓↓ |
| 1110 | 1111 | 1100 |
| 3<br>(GHI) | 1<br>(J) | 2<br>(KL) |
| φ6 | φ3 | φ2 |
| 000009 | 00000C | 00000D |
| 100008 | 10000B | 10000C |

FIG. 5C

DIRECT MEMORY ACCESS CONTROLLER HANDLING EXCEPTIONS DURING TRANSFERRING MULTIPLE BYTES IN PARALLEL

FIELD OF THE INVENTION

The present invention is directed to a direct memory access controller and, more particularly, to a method and apparatus for handling exceptions during a data transfer by a direct memory access controller wherein multiple bytes are moved in parallel from offset byte boundaries.

BACKGROUND OF THE INVENTION

In modern computer systems, direct memory access (DMA) controllers are used to transfer data from a source location in, e.g., a memory system to a destination location within the computer system. Typically, the DMA controller sequences through read and write cycles to read data from the source location and write the data to the desired destination location. In this manner, the data transfer operation is off loaded from, e.g., a CPU to free the processing power of the CPU for the performance of other processing functions. The DMA controller utilizes memory addresses specified by the CPU to locate the source and destination locations for the data transfer.

In memory systems, an address space is used to uniquely define each data storage location available within the system. For example, an n-bit address will uniquely identify $2^n$ locations with each unique value of the n-bit address being used to identify one of the $2^n$ locations. Each address is aligned relative to the other addresses of the address space to define a predetermined amount of data at any one storage location, e.g., a byte (eight bits). In a byte aligned system, each address uniquely identifies a location storing one byte of data.

For efficiency of operation, word or longword aligned addresses are often used so that each data fetch or store from or to memory transfers two bytes (word) or four bytes (longword) at one time. In a longword aligned memory, each unique n-bit address value would still identify the beginning of a byte of data, however, the two lowest order bits <1:0> of each address are always set to 0:0 when accessing memory to align addressable locations at longword boundaries. The lowest order two bits <1:0> can be used to specify an offset within a longword to uniquely identify each one of the four bytes in the accessed longword, as may be required, during processing by a CPU. In the general case, the lowest m bits of an address are set to zero wherein m equals the number of bits required to offset memory location boundaries by the number of bytes, n, to be accessed in a single memory cycle. Of course, the m lowest bits can be used to locate a specific byte within the n byte block specified by an n byte aligned address.

In various DMA applications, a device, such as a CPU, will specify initial or base source and destination addresses for a block of data and a count number to indicate to the DMA controller the total number of bytes in the block to be transferred. The DMA controller will then proceed to transfer longwords, beginning at the initial source address to the initial destination address, while decrementing the count and incrementing each of the initial source and destination addresses to the next longword boundary with each longword transfer until the count equals zero to indicate that all of the bytes of the block have been transferred.

However, the DMA controller may be reading and writing the data from and to a longword aligned memory device such as a DRAM while one or both of the initial source and destination addresses specified by a CPU desiring a data block transfer, are not aligned at longword boundaries. Thus, known DMA controllers have been designed to shift bytes within data lines of a bus to align reads and writes to and from the DRAM at appropriate allowed data boundaries. As should be understood, the DMA controller operates most efficiently when it can shift and transfer multiple bytes of, e.g., a longword in parallel. The known DMA controllers must often use extra clock cycles to align bytes to proper memory boundaries or extra write cycles to do partial writes within aligned memory locations throughout a data transfer operation.

In addition, during reads and writes of data there are typically error conditions, exceptions and special character handling checks that must be performed relative to the data to guarantee the integrity of the data being transferred and to assure proper handling of certain bytes of the data, as may be required within the particular computer system where the data transfer occurs. It is generally advantageous to design the DMA controller to perform the various checks on the data while moving the data. In this manner, both the data transfer and data checking operations are off loaded from the CPU.

While known DMA controllers have been designed to perform certain exception handling and special character detection operations during a data transfer, these controllers perform the data check and transfer operations serially. In other words, the DMA controller will first read data from the source location, then perform data checking and then write the data to the desired destination location. The serial nature of the known DMA controller operation results in relatively low speed performance, which degenerates the advantages gained from the CPU off load.

SUMMARY OF THE INVENTION

The present invention provides a method and apparatus to handle preselected data check operations in parallel to multiple byte moves by a DMA controller from offset byte boundaries. In this manner, the data transfer and data check operations are performed substantially simultaneously to achieve high speed data transfers with appropriate data checks accomplished automatically during the flow of data through the DMA controller. In addition, the DMA controller of the present invention implements parallel data transfer and data check operations while maintaining alternate read/write cycles substantially throughout the data transfer operation to maximize data throughput.

Generally, the present invention comprises a DMA controller having n byte DATA IN and DATA OUT latches coupled to one another by a cross-bar switching multiplexer. The number of bytes stored in each latch is determined by the addressing scheme implemented in the computer system where the DMA controller is operating. For example, in a longword aligned memory system, n will equal four inasmuch as each longword transfer moves four bytes during each read and write operation.

Data retrieved from a source location during a read cycle of the DMA controller are latched into the DATA IN latch. A shift controller is coupled to the cross-bar switching multiplexer to cause the cross-bar switching multiplexer to shift bytes output from the DATA IN latch to appropriate offset locations within the DATA OUT latch as a function of an offset between the source and destination addresses, if any. The bytes transferred from the DATA IN latch to the DATA OUT latch via the cross-bar switching multiplexer are output from the DATA OUT latch during a write cycle of the DMA controller for writing into the respective destination address.

A combinational logic block arrangement is utilized to examine the lowest most bits of the source and destination addresses and information derived from the number of bytes of a longword already moved from the DATA IN latch to the DATA OUT latch to determine which bytes of the DATA IN latch are to be latched into the DATA OUT latch during each cycle for use during a write cycle of the DMA controller. An n-bit output of the combinational logic block arrangement is applied as a latch enable signal to the DATA OUT latch to control the latching of data into the DATA OUT latch, on a byte basis, with each bit of the n-bit output corresponding to one of the bytes of the longword.

In this manner, only those bytes determined by the combinational logic block arrangement as appropriate for use are latched into the DATA OUT latch during any particular cycle, for output from the DATA OUT latch during a write cycle of the DMA controller.

In the longword aligned memory system of our example, all data read from or written into memory must be aligned at longword boundaries. In other words, as explained above, the lowest two bits of each address must be set to 0:0 during read and write operations. Thus, if one or both of the source and destination addresses specified by a CPU have values other than 0:0 for the lowest two bits of either address, the shift controller and combinational logic block arrangement operate to properly align bytes to longword boundaries.

To illustrate the operation of these components, assume that a specified source address is longword aligned but that the lowest two bits of the specified destination address are <0:1>. Thus, the destination for the data is offset by one byte from a longword boundary. Accordingly, the shift controller must control the cross-bar switching multiplexer to transfer the first three bytes (corresponding to lowest address bits 0:0, 0:1, and 1:0, respectively, of the longword loaded into the DATA IN latch from the source location during a read cycle) to locations of the DATA OUT latch corresponding to lowest address bits 0:1, 1:0 and 1:1, respectively, to align the data with the 0:1 start of the destination address. The last byte of the longword stored at the location of the DATA IN latch corresponding to lowest address bits 1:1 must eventually be transferred to the 0:0 location of the DATA OUT latch.

As should be understood, the last byte to be moved to the DATA OUT latch is to be written at a longword boundary of a longword location adjacent to the longword location containing the destination address to achieve the one byte offset between the source and destination addresses. The first three bytes are written into byte locations 0:1, 1:0 and 1:1 of the destination longword location, as specified by the 0:1 values for the lowest two bits of the destination address, and the last byte is shifted into location 0:0 of the next adjacent longword location.

While the shift controller and cross-bar switching multiplexer properly align bytes within the DATA OUT latch for writing to the destination address, the combinational logic block arrangement is used to control which bytes stored in the DATA IN latch are latched into the DATA OUT latch during each cycle for eventual writing to memory during a write cycle of the DMA controller. In our longword example, only the first three bytes of the longword to be transferred are enabled by the combinational logic block arrangement during the write cycle subsequent to the read cycle during which the longword is loaded into the DATA IN latch. The fourth byte is enabled during a next cycle for output by the DATA OUT latch from location 0:0 during a next subsequent write cycle together with three bytes of a subsequent longword offset to locations 0:1, 1:0 and 1:1 of the DATA OUT latch and so on.

The DMA controller of the present invention is arranged to assert a control signal during a preselected time interval of each cycle (both read and write) of operation of the DMA controller. The control signal permits the bits of the n-bit enable signal that are asserted by the combinational logic block arrangement during the respective cycle to enable the corresponding byte locations of the DATA OUT latch to latch the appropriate bytes from the DATA IN latch.

During each cycle, the combinational logic block arrangement asserts those bits of its enable output signal corresponding to bytes that should be transferred to the DATA OUT latch. Referring once again to our longword example, the combinational logic block arrangement enables the first three bytes to locations 0:1, 1:0 and 1:1 of the DATA OUT latch for the subsequent write cycle. The control signal is asserted to allow the latch enable signal through to the DATA OUT latch in time for a write pulse portion of the next write cycle. The combinational logic block arrangement then enables, e.g., during the next read cycle, the fourth byte to the 0:0 location and the control signal is asserted before the data of the next read cycle becomes stable at the data output of the DATA IN latch. In this manner, the fourth byte is properly latched into the 0:0 location of the DATA OUT latch before the 1:1 location of the DATA IN latch is overwritten with data from the next longword.

As the DMA controller increments the source and destination addresses to a next longword, the offset will remain the same. Thus, during the next cycle, the combinational logic block arrangement will once again enable the first three bytes of the next longword to locations 0:1, 1:0 and 1:1 of the DATA OUT latch with the fourth byte of the previous longword having already been latched into location 0:0 during the previous cycle.

To summarize, the control signal is asserted during each read and write cycle and is timed to cause the latching of the appropriate bytes from the DATA IN latch to the DATA OUT latch:

i) prior to data becoming stable at the output of the DATA IN latch in a read cycle; and ii) prior to the write pulse portion in a write cycle.

Bytes of data from an offset block of n bytes can be shifted and moved from the DATA IN latch to the DATA OUT latch during each cycle of operation so that, ordinarily, a write cycle can immediately follow each read cycle. Thus, the combinational logic block arrangement, control signal scheme of the present invention achieves byte shifting to accommodate offset byte boundaries while permitting the DMA controller to,generally proceed in alternate read/write cycles for a maximized data throughput rate.

Pursuant to another feature of the present invention, a data check device is coupled to the output of the DATA IN latch, in parallel to the DATA OUT latch, In this manner the output of the DATA IN latch is input to the data check device and can be processed in parallel to the data flow through the cross-bar multiplexer and DATA OUT latch. The data check device is arranged to perform preselected data error detections and exception and special character handling checks on each byte moved from the DATA IN latch to the DATA OUT latch.

An output of the data check device comprises an n-bit signal with each bit corresponding to one of the bytes moved into the DATA OUT latch. The data check device sets the state of each bit of the output signal to indicate the status of the corresponding byte in respect of the validity of the data of the byte as determined in the data checking operation of the data check device.

Each of the n-bit signal of the data check device and the n-bit latch enable signal of the combinational logic block arrangement is input to a priority logic device. The priority logic device examines the latch enable and data check bits for each byte of a longword latched into the DATA OUT latch. The output of the priority logic device is an n-bit write signal with each bit corresponding to one of the bytes of the longword. The priority logic device generates the n-bit write signal so that the n-bit signal equals the latch enable signal when each bit of the n-bit output of the data check device indicates that the corresponding byte is valid. However, the priority logic device implements an encoding scheme such as priority encoding logic to enable in the n-bit write signal only those bits corresponding to bytes that are valid. When using priority encoding logic, e.g., only those bytes of lower order than the lowest byte found to have an error or exception or to require special handling, is enabled in the n-bit write signal.

According to the present invention, the data check operation proceeds in parallel to the generation of the n-bit latch enable signal during each cycle. Each of the outputs of the data check device and the priority logic device become stable during a particular cycle sometime after data is latched into the DATA OUT latch. The data check operation and write signal generation can proceed:

i) in a read cycle, on a previous longword until the new longword of the read cycle becomes stable at the output of the DATA IN latch, and ii) in a write cycle until the write pulse portion of the cycle.

In n byte aligned memory systems, such as a longword aligned memory, a byte control input is provided in the memory to control which bytes of write data for a particular longword aligned address are to be used to overwrite the data at the addressed location of the memory. The n-bit write signal output by the priority logic device is accumulated for each cycle up to a write cycle and is coupled to the byte control input of the memory to which the longword is to be moved. In this manner, only those bytes latched into the DATA OUT latch via the n-bit latch enable signal that are found to be valid by the data check device are written into memory under the control of the write signal. The DMA controller of the present invention utilizes the time available during each cycle before data either becomes stable in the DATA IN latch (read cycle) or is written from the DATA OUT latch (write cycle), to perform data checking operations.

Thus, pursuant to the present invention, the latencies of each cycle are fully utilized to shift, move and check data in parallel as the data are moved through the DMA controller. The use of the early part of each cycle to determine and offset data shifts and to perform data checks in parallel also permits the DMA controller to generally alternate read/write cycles without the need for extra clock cycles to align bytes to proper memory boundaries or extra write cycles to do partial writes. Accordingly, the DMA controller off loads both data transfer and data check responsibility from a CPU while achieving high speed operation such that, in a particular application, a lower cost CPU car be used without a sacrifice in the overall performance of the computer system.

DETAILED DESCRIPTION

Figure 1:
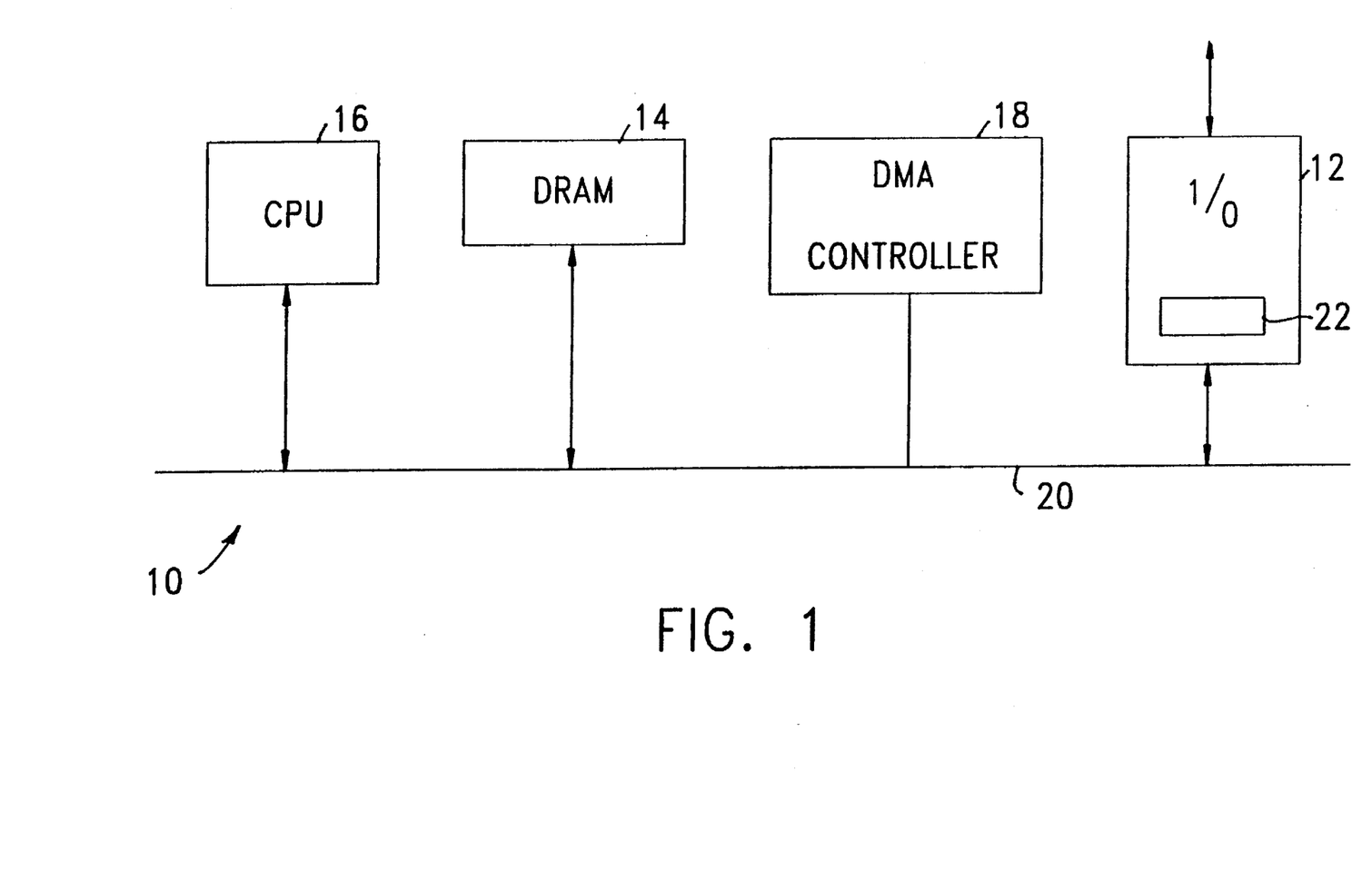
FIG. 1 illustrates, in block diagram form, an exemplary computer system including a DMA controller according to the present invention.

Referring now to the drawings, and initially to FIG. 1, there is illustrated an exemplary computer system generally designated by the reference numeral 10. The computer system 10 comprises an I/O device 12, a DRAM 14, a CPU 16 and a DMA controller 18 all coupled to one another by a bus 20.

The I/O device 12 operates to transmit and receive data and can include a FIFO buffer 22 for temporary storage of the received data and/or data to be transmitted. In a typical operation, the received data, e.g., may have to be moved from the FIFO buffer 22 of the I/O device 12 to a block location in the DRAM 14. Rather than impose the FIFO to DRAM data transfer on the CPU 16, the DMA controller 18 is operated to read the data in the FIFO buffer 22 and write that data to the DRAM 14. Moreover, in certain operations, it may be necessary to transfer data from one location in the DRAM 14 to another location in the DRAM 14. Again, the DMA controller 14 is utilized to perform the data transfer so as to free the CPU 16 from relatively low level housekeeping chores.

As is known in the computer field, the CPU 16 communicates source and destination locations and a byte count number across the bus 20 to the DMA controller 18. The DMA controller 18 then performs a sequence of read and write operations over the bus 20 to complete the required data transfer, as described above.

In addition, according to the present invention, the DMA controller 18 checks each byte moved from a source to a destination location for certain conditions. The conditions vary depending upon the specific functions and applications implemented in the computer system. They can include, e.g., DRAM parity error detection and special character identification. The DMA controller 18 performs a parity check on each byte and will assert an error flag upon detection of a parity error.

Special character identification relates to data received by the I/O device 12. For example, certain bytes in a message received by the I/O device 12 may require special handling by the CPU 16. The DMA controller 18 can include a content addressable memory (CAM) (not illustrated in FIG. 1; 120 in FIG. 3) containing special character information. Each byte moved by the DMA controller 18 is used as a lookup index to the CAM to ascertain whether the byte is a Special character requiring specific handling by the CPU 16. Again, upon the identification of a special Character, the DMA controller 18 asserts a flag.

According to the present invention, the DMA controller 18 generally operates in a sequence of alternate read and write cycles to maximize data throughput in a data transfer operation. In other words, data are continuously read and immediately written in a next cycle, in most instances, to complete the data transfer in a minimum number of cycles. In addition, the DMA controller 18 performs the data checking operation in parallel to the movement of the data through the DMA controller 18 to maximize the overall speed of operation.

Figure 2A:
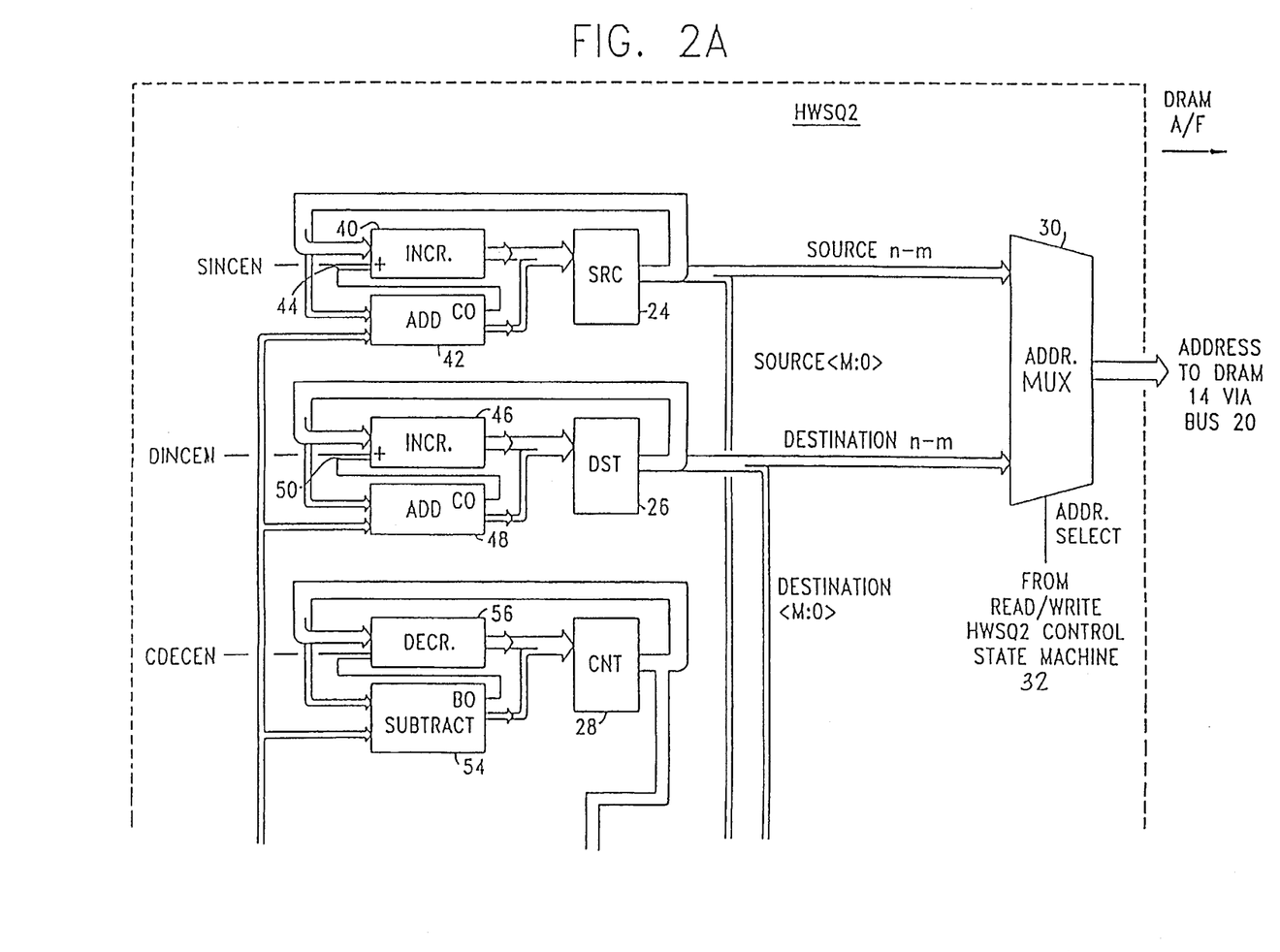
FIG. 2 is a block diagram of the DMA controller of FIG. 1.
Figure 2B:
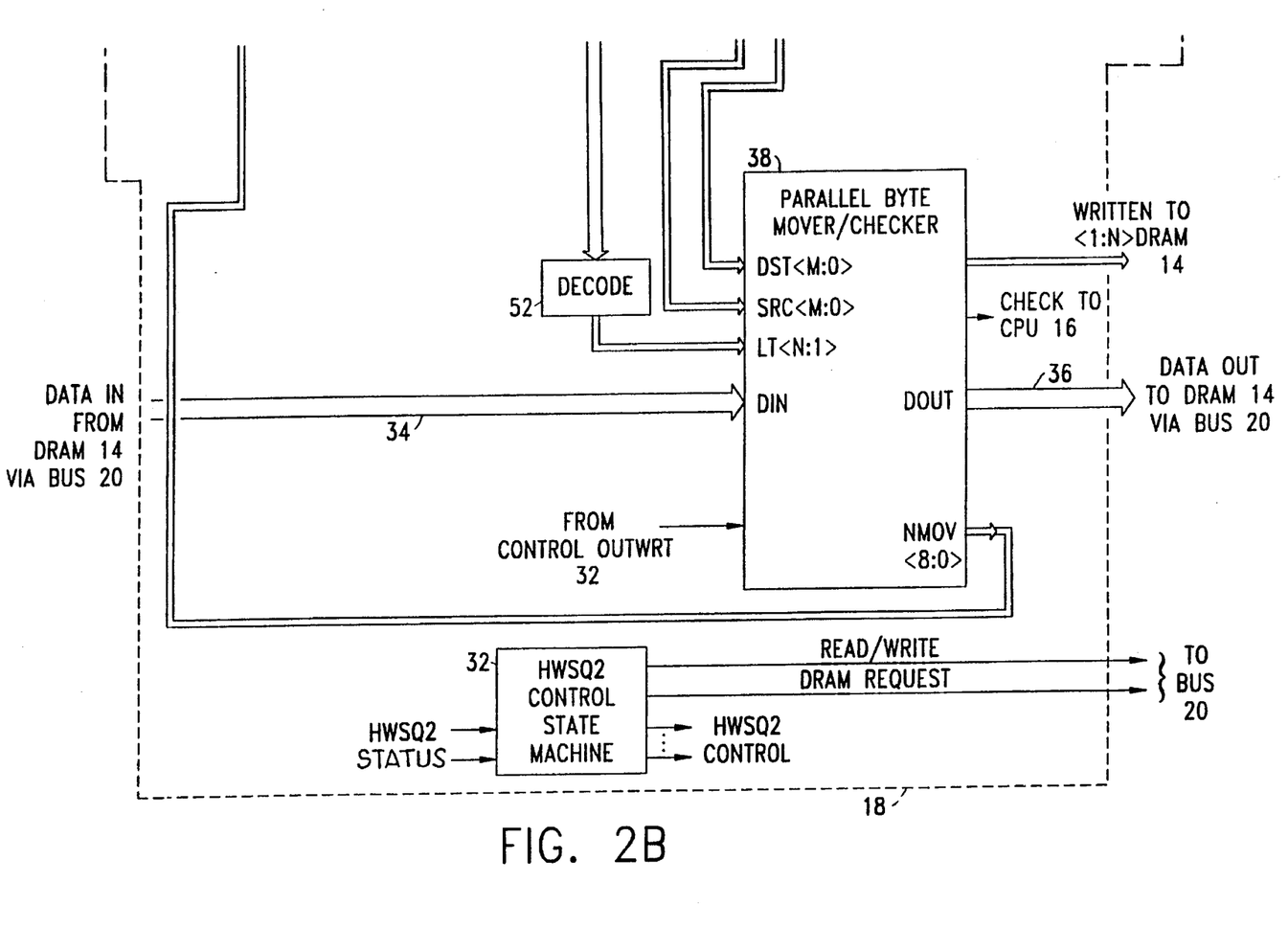

Referring now to FIG. 2, there is illustrated in block diagram form, a representative embodiment of the DMA controller 18. The DMA controller 18 includes a source address register 24, a destination address register 26 and a count register 28. For simplification of description, the representative embodiment is arranged to continuously transfer an X byte block of data starting from a set initial source address of the DRAM 14 stored in the source address register 24 to a set initial destination address of the DRAM 14 stored in the destination address register 26 and continuing until X bytes have been transferred. The value X is stored in the count register 28.

It should be understood that the address and count values stored in the registers 24, 26 and 28, respectively, are left in their final settings after a particular X byte data transfer is completed. When there is an unexpected early finish of the transfer process due e.g. to an error or special condition, as discussed below, the CPU 16 can determine that the contents of the count register 28 did not reach zero and use the value of the source address register 24 to locate the erroneous or special character. The CPU 16 can further use the contents of the count register 28 to determine the number of bytes that were moved, thus allowing further processing of the uneffected bytes. In addition, the registers 24, 26 and 28 can be coupled to the CPU 16 for loading of new values should a data transfer from new source and destination addresses involving a new value for X be desired, as is known in the art.

Each of the source address and destination address is an (n:0) bit address wherein n+1 equals the number of bits required to uniquely identify a byte location in the DRAM 14. For example, n equals 22 when a 23 bit address bus is used, identifying 8M bytes of address space. Moreover, when the DRAM 14 is an N byte aligned memory system, the lowest order m:0 bits of an address used to access the DRAM 14 during read and write operations are set to zero to align memory access boundaries in the memory at N byte locations. The value of m is such that the number of bits m:0 equals the number of bits required to uniquely identify each one of the N bytes within an N byte block of data. In a longword aligned system, m equals 1 so that bits 1:0 of each address are set to zero to align data access boundaries at four byte intervals.

The highest order (n-m) bits of each of the source and destination addresses output from the registers 24, 26, respectively, are input to first and second inputs of an address multiplexer 30, respectively. A read/write control state machine 32 is coupled to control lines of the bus 20 and to a select input of the address multiplexer 30. An appropriate known bus protocol is implemented in the computer system 10 to facilitate the transfer of data over the bus 20 during read and write operations. The remaining m:0 bits of each of the source and destination addresses are used to indicate which bytes are to be actually read or written. In the read operation, all bytes represented by m:0 are read in parallel into the parallel byte mover/checker 38. For the write operation, all bytes are written in parallel but only those bytes flagged as indicated by m:0 are actually written to memory.

The read/write control state machine 32 operates according to the bus protocol to arbitrate for control of the bus 20 and to assert and receive the necessary control and handshaking signals as may be required by the bus protocol upon winning control of the bus 20. The control and handshaking signals are used to transition through a read or write operation between components coupled to the bus 20, as, e.g., the DMA controller 18 and the DRAM 14, as is generally known in the art. As illustrated in FIG. 2, the control signals include a READ/WRITE signal to indicate to the bus 20 whether a particular transaction is a read or write transaction. A DRAM REQUEST signal is used to initiate an arbitration for the bus 20.

The read/write control state machine 32 also asserts an ADDR SELECT signal coupled to a select input of the address multiplexer 30. The ADDR SELECT signal is used to select one of the source or destination addresses for output by the address multiplexer 30 depending on whether the read/write control state machine 32 is performing a data read or write over the bus 20.

As illustrated in FIG. 2, the output of the address multiplexer 30 is coupled to address lines of the bus 20 so that data can be read from or written to the appropriate location of, in this instance, the DRAM 14. In addition, each of a DATA IN bus 34 and a DATA OUT bus 36 is coupled to data lines of the bus 20. The DATA IN bus 34 is used to receive data from the source address over the bus 20 during a read operation by the DMA controller 18. The DATA OUT bus 36 is used to transfer data to the destination address over the bus 20 during a write operation of the DMA controller 18.

A parallel byte mover/checker 38 is coupled to the DATA IN bus 34 to receive data from the source address during a read operation of the DMA controller 18. The parallel byte mover/checker 38 is further coupled to the DATA OUT bus 36 to affect a transfer of the read data back to the bus 20 for writing to the destination address by the DMA controller during a write operation. The parallel byte mover/checker 38 also performs data checking operations while the data is being moved through the mover/checker 38, as will appear.

The parallel byte mover/checker 38 also takes as inputs a destination address pointer (DST <m:0>) comprising bits <m:0 of the destination address, a source address pointer (SRC <m:0>) comprising bits m:0 of the source address, an output-write-time (OUTWRT) signal output by the state machine 32 and a "less than" signal (LT <N:1>) comprising N bits (the "less than" signal provides information on the number of bytes left in the X byte block). Moreover, in addition to the DATA OUT output, the mover/checker 38 also outputs a write control signal (WRITEN <1:N>, a signal indicating the number of bytes moved during a memory cycle (NMOV <B:0>), (B equals the number of bits necessary to specify the maximum number of bytes that can be moved during a memory cycle; B equals 2 when the DRAM 14 is longword aligned (NMOV (2:0) from a minimum of 0,0,0 to a maximum of 1,0,0)) and a check signal. The various input and output signals are used to control the flow of data through the DMA controller 18, to control the writing of bytes at the destination address of the DRAM 14 and to increment the source and destination addresses and decrement the count number, as will be explained below.

The (n-m) highest order bits of the source address output by the source address register 24 are input to an incrementer 40, while the lowest order <m:0> bits of the source address are input to an adder 42. The incrementer 40 includes a source increment enable input 44 and operates to increment the (n-m) bits of the source address to a next N byte boundary value whenever a signal is asserted at the source increment enable input. A carry signal (SINCEN) output by the adder 42 is coupled to the source increment enable input 44 of the incrementer 40. In this manner, the incrementer 40 increments the (n-m) bits of the source address to a next N byte boundary whenever the SINCEN signal is output by the adder 42.

The adder 42 adds the value of the <m:0> bits input from the register 24 to the value of the NMOV signal output by the mover/checker 38. Thus, the output of the adder 42 comprises the value for the <m:0> bits increased by the number of bytes moved by the mover/checker 38 during a current memory cycle. As should be understood, the adder 42 will output the SINCEN signal whenever the sum of <m:0> and NMOV carries a binary "1" value to the (m+1) bit of the source address. The Outputs of the incrementer 40 and adder 42 are Concatenated and input to the source address register 24 to provide an updated source address to the address multiplexer 30 and an updated source address pointer for input to the mover/checker 38.

Similar components are coupled to each of the destination address register 26 and count register 28 to provide updated values to these registers as the DMA controller 18 transitions through successive memory cycles. The (n-m) highest order bits output by the destination address register 26 are input to an incrementer 46 and the <m:0> lowest order bits are input to an adder 48. A destination increment enable 50 of the incrementer 46 receives a carry signal (DINCEN) output by the adder 48. As with the adder 42, the adder 48 adds the value of NMOV to bits <m:0> of the destination address. The DINCEN signal is asserted whenever the addition performed by the adder 48 carries a binary "1" value to the (m+1) bit of the destination address to increment the (n-m) highest order bits. The n-m bits output by the incrementer 46 are concatenated with the <m:0> bits output by the adder 48 to provide an updated value for the destination address stored in the register 26.

The count register 28 is arranged to store a number of bits sufficient to represent the maximum number X of bytes that can be transferred in a data transfer operation of the DMA controller. In the representative embodiment, the count register stores a sixteen bit number, (CNT) <15:0>. The output of the count register 28 is input to a decoder 52. The decoder 52 examines the byte count and generates the LT <N:1> signal input to the parallel byte mover/checker 38.

In a longword aligned DRAM 14, N equals 4 and the LT <N:1> signal is set to 0,0,0,0 by the decoder 52 when the remaining byte count stored in count register 28 is more than four bytes. When the byte count in the register 28 is less than four but greater than two, LT <4>=1 and the LT <N:1> signal is set at 1,0,0,0. When all of the X bytes have been transferred, LT <1> set to 1 (LT <N:1>=0,0,0,1). The LT <N:1> signal is asserted in each instance by the decoder 52 such that if any LT signal is asserted, all upper-order signals beyond the asserted LT signal are also asserted. For example, if LT <3> is asserted, indicating that there are less than three bytes left to be moved (i.e. two bytes left), LT <N:1> is set at 1,1,0,0. The LT <N:1> signal is used by the mover/checker 38 to control the number of bytes moved in a memory cycle, as will appear.

The <m:0> bits of the output of the count register 28 are input to a subtract device 54. The NMOV signal of the mover/checker 38 is also input to the subtract device 54 such that the subtract device 54 subtracts the value of NMOV from the <m:0> bits of the byte count during each memory cycle. In this manner, the number of bytes moved during each memory cycle by the mover/checker 38 is decremented from the byte count to provide a remaining byte count.

A decrementer 56 receives the higher order bits above <m:0> output by the register 28. The decrementer 56 includes a decrement count enable input that is coupled to a borrow signal (CDECEN) of the subtract device 54. Thus, whenever the value of NMOV is large enough to require a borrow from bit m+1 of the byte count to complete the subtraction from <m:0>, the CDECEN signal is asserted to decrement the value input to the decrementer 56.

The output of the decrementer 56 is concatenated with the output of the subtract device 54 to provide an updated remaining byte count value for input to the register 28. In this manner, the byte count iS decremented during each memory cycle until LT <N:1> equals 1,1,1,1 (indicating no bytes left).

Figure 3A:
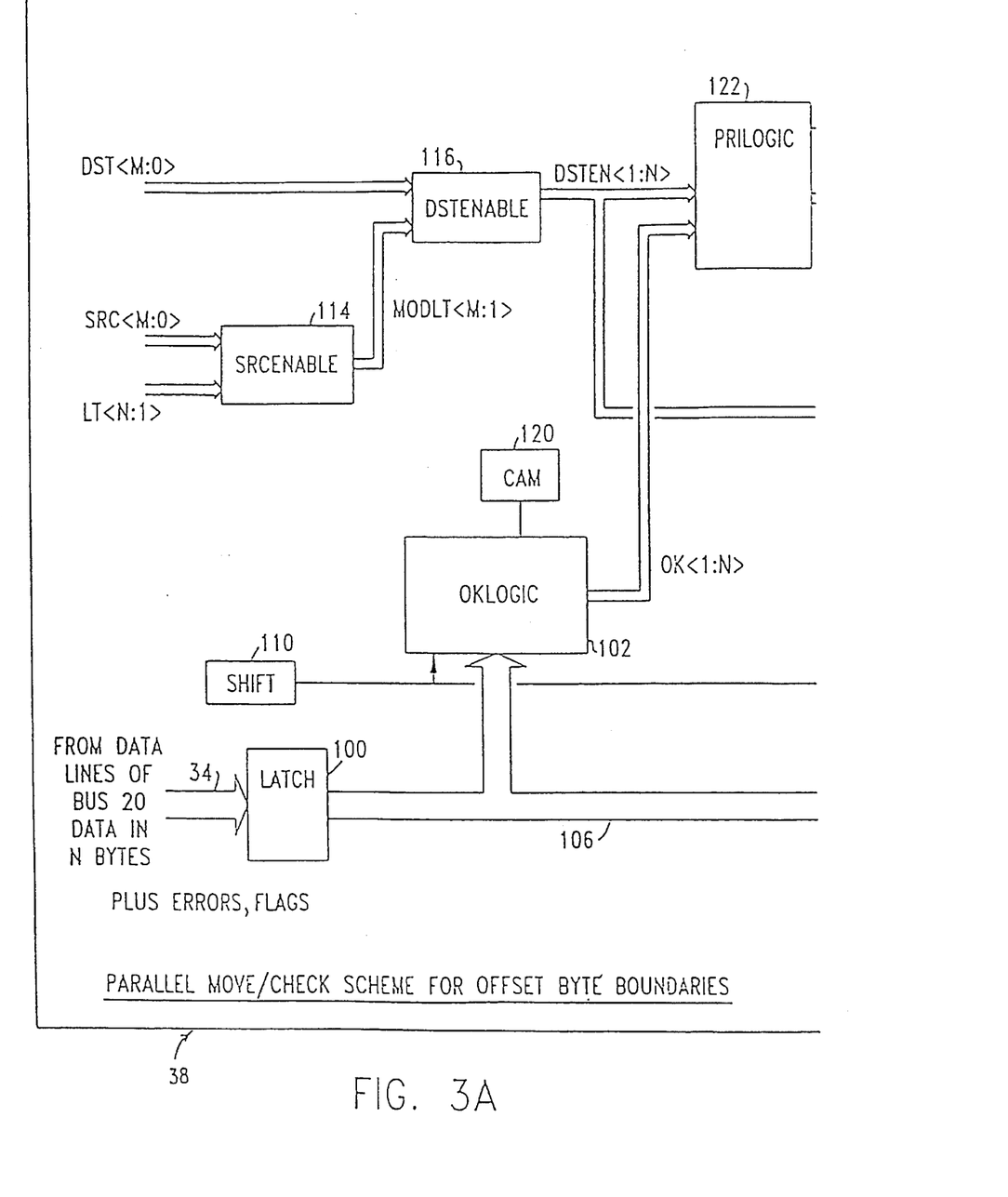
FIG. 3 is a block diagram for the data mover/checker device of FIG. 2.
Figure 3B:
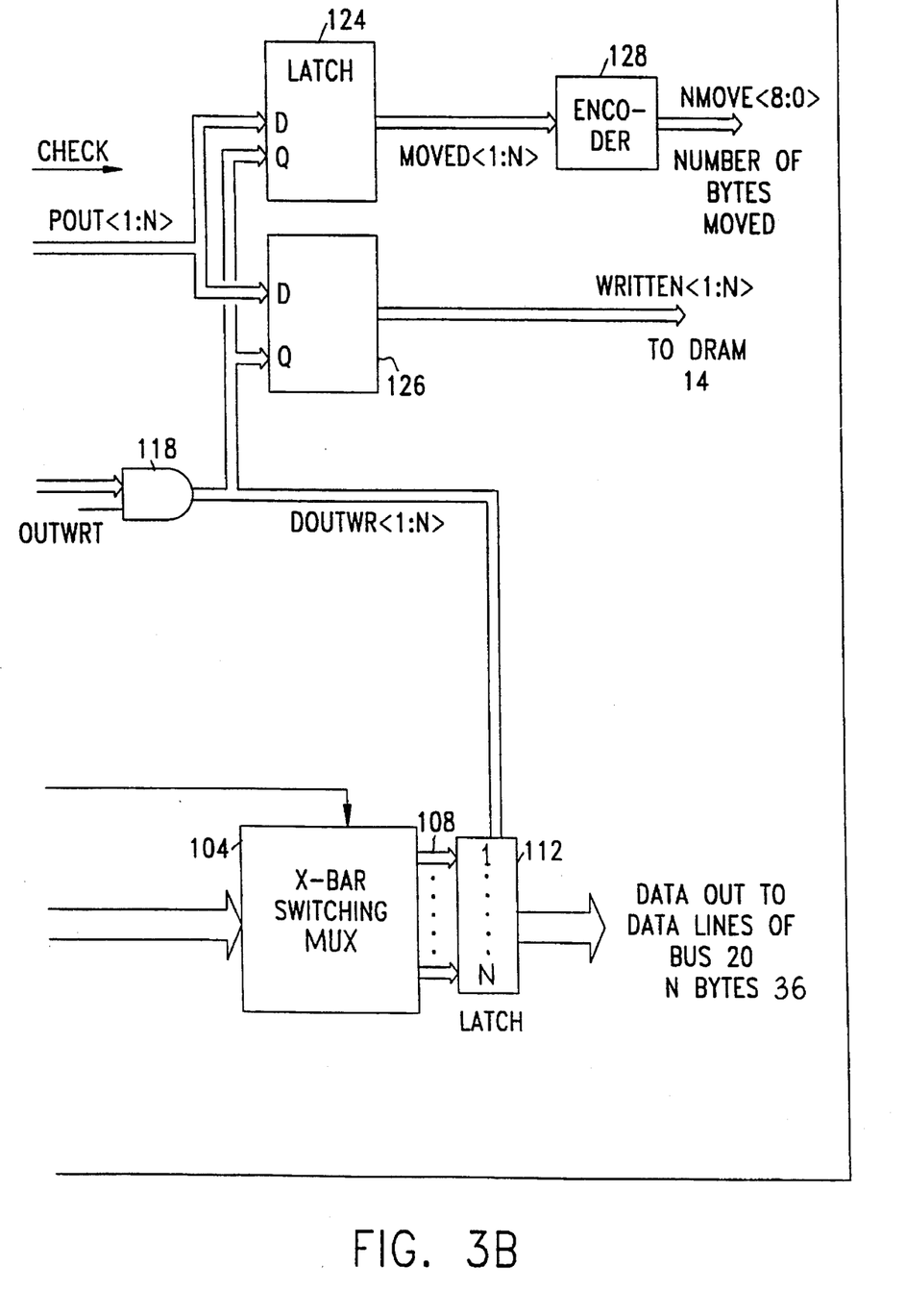

Referring now to FIG. 3, there is illustrated in block diagram form, the mover/checker 38. The mover/checker 38 includes an N byte DATA IN latch 100 coupled to the DATA-IN bus 34 to receive the bytes transferred to the bus 20 by the DRAM 14 during a read memory cycle. An output of the DATA IN latch 100 is coupled to each of a data checker 102 (OKLOGIC 102) and a cross-bar switching multiplexer 104 by a bus 106.

The cross-bar switching multiplexer 104 has N, byte wide outputs 108, one for each byte output by the DATA IN latch 100, and is controlled to shift any byte input to the cross-bar switching multiplexer 104 to any one of the outputs 108. To that end, a shift control device 110 is coupled to a control input of the cross-bar switching multiplexer 104 to control the shift operation of the multiplexer 104. The shift control device 110 stores information on the offset between source and destination addresses stored in the registers 24, 26 so as to properly align bytes received from a source address of the DRAM 14 to the destination address location of the DRAM 14.

The N outputs 108 of the cross-bar switching multiplexer 104 are each input to an N byte DATA OUT latch 112. An output of the DATA OUT latch 112 is coupled to the DATA OUT bus 36 to transfer the bytes latched into the DATA OUT latch 112 to the bus 20 during a write memory cycle, as will appear.

Each of the source address pointer (SRC <m:0>) and the LT <N:1> signal output by the source address register 24 and decoder 52, respectively, (see FIG. 2) are input to a source-enable SRCENABLE combinational logic block 114. The SRCENABLE block 114 modifies the byte count value represented by the LT <N:1> signal by an offset from an N byte DRAM boundary indicated by the <m:0> bits of the source address to provide a modify-less-than (MODLT) <N:1> output signal. The function of the SRCENABLE block 114 is defined as follows:

MODLT <N:1>=> min {(# bytes available at SRC), (# bytes remaining as per LT <N:1>)}

In a longword aligned DRAM 14, N equals 4 and SRC <m:0> is SRC <1:0>. When SRC <1:0> is 1:1 only one byte in the DATA IN latch 100 (corresponding to the 1:1 address location) is potentially available for transfer to the DATA OUT latch 112, since the source address is offset by three bytes from a longword boundary. Similarly, when SRC <1:0> is 0:1, three bytes are potentially available for transfer (corresponding to address locations 0:1, 1:0 and 1:1) and when SRC <1:0> is 1:0, two bytes of the DATA IN latch are potentially available (corresponding to address locations 1:0 and 1:1). An exception to the general rule occurs when SRC <1:0> is 0:0. In this instance, 0:0 indicates all four bytes are available except when a previous memory cycles was a write cycle and the source address is aligned with the destination address, in which case none of the bytes are available.

According to the above function for the SRCENABLE block 114, the MODLT <N:1> is set to reflect the <m:0> bit values of the source address unless LT <N:1> is less than that value, in which case MODLT <N:1> is set to equal LT <N:i22. Thus, if, e.g., SRC <m:0> is 0:1 (three bytes available) and LT <N:1> is 0,0,0,0 (more than four bytes left in the byte count), then MODLT <N:1> is set to 1,0,0,0 (less than four bytes available, i.e. three available). However, if SRC <m:0> is 0:1 and LT <N:1> is 1,1,1,0 (less than two available, i.e. only one byte left in the byte count), then MODLT <N:1> is set to 1,1,1,0.

Each of the MODLT <N:1> signal and the destination address pointer (DST <m:0>) output by the destination address register 24 (see FIG. 2) are input to a destination-unable (DSTENABLE) combinational logic block 116. The DSTENABLE block 116 utilizes each of the DST <m:0> and MODLT <N:1> signals to generate a DATA OUT latch 112 enable signal, DSTEN <1:N>, wherein each bit represents one of the DATA OUT bytes from N to 1.

The function of the DSTENABLE block 116 is as follows:

DSTEN <1:N>≧$F_2$ {$F_1$[DST <m:0>], MODLT <N:1>} where $F_1$ is a function which enables per byte destination bits of DSTEN <1:N> based upon DST <m:0>, and $F_2$ is a function which, starting at the lowest order enabled bit from $F_1$, enables destination bytes from that point upwards to either the maximum set by MODLT <N:1> or the highest order bit from $F_1$, whichever is less.

For example, in our longword implementation, when DST <m:0> is 0:1, $F_1$ sets DSTEN <1:4> to 0,1,1,1, such that the three bytes corresponding to destination locations 0:1, 1:0 and 1:1 are potentially writable to the DRAM 14. The DSTEN <1:4> value derived from the value of DST <m:0> is then modified by $F_z$ as a function of MODLT <N:1>. Thus, if MODLT <N:1> is 1,1,0,0 (less than three, i.e. two bytes available), DSTEN <1:4>=0,1,1,1 is modified to DSTEN <1:4> equal to 0,1,1,0. This is because although three destination byte locations of the one byte shifted longword location defined by DST <m:0> equal to 0:1 are available to receive bytes, the MODLT <N:1> signal indicates either only two bytes are available from the source location or the remaining byte count requires only two bytes to be transferred to complete the X byte data transfer.

The DSTEN <1:N> signal output by the DSTENABLE block 116 is input to an AND logic device 118. The AND logic device 118 outputs a destination-output-write (DOUTWR) <1:N> signal when both the DSTENABLE <1:N> and OUTWRT signals are asserted. The OUTWRT signal is asserted by the state machine 32 (see FIG. 2) once during each memory cycle to synchronize the latching of bytes from the DATA IN latch 100 to the DATA OUT latch 112, as will be explained with reference to the timing diagram of FIG. 4.

The enabled bits of DOUTWR <1:N> will correspond to the enabled bits of DSTENABLE <1:N> when the OUTWRT signal is asserted. As illustrated in FIG. 3, the DOUTWR <1:N> signal is coupled to a latch enable input of the DATA OUT latch 112. In this manner, only those bytes corresponding to enable bits of the DOUTWR <1:N> signal are latched from the DATA IN latch 100 to the DATA OUT latch 112 during each memory cycle when the OUTWRT signal is asserted by the state machine 32.

As discussed, the shift control device 110 controls the cross-bar switching multiplexer 104 to shift the bytes from the DATA IN latch 100 to appropriate ones of the outputs 108 so that the DOUTWR <1:N> signal latches the bytes moved across the bus 106 to the proper byte locations of the DATA OUT latch 112.

The output of the shift control device 110 is also input to the OKLOGIC device 102 to affect a shifting of the bytes input to that device so as to correspond to the locations of the respective bytes input to the DATA OUT latch 112. The OKLOGIC device 102 is designed to perform preselected data check operations, as, e.g., DRAM parity checks and "special" character detection, as discussed above. A content addressable memory (CAM) 120 is coupled to the OKLOGIC device 102 for special character identification look-up.

The operation of the OKLOGIC device 102 proceeds in parallel to the operation of the blocks 114, 116 to produce an OK <1:N> signal output. For complete parallel operation, N CAMS should be provided, one for each byte that can be moved in a memory cycle. However, one CAM can be utilized for N successive look-ups when the lookup speed is fast enough to complete the special character check by the time the OK <1:N> signal must become stable for a write cycle, as will appear.

The OK <1:N> signal provides one bit for each byte with each bit set by the OKLOGIC device 102 to reflect the result of its data check operation. In other words, the OKLOGIC device 102 associates the result of its checks for each byte to a corresponding one of the bits of the OK <1:N> signal. The OKLOGIC device 102 will, e.g., set a bit to a logical "1" when the respective byte is "OK", i.e. does not have a parity error or is not "special". Each bit of the OK <1:N> signal corresponds to the bit of the DSTEN <1:N> signal representing the same byte.

Each of the DSTEN <1:N> and OK <1:N> signals is input to a priority logic device 122. The function of the priority logic device is as follows:

NOTOK <1:N>≧($F_3$ [OK <1:N>, DSTEN <1:N>])

PRIDIS <1:N>≧($F_4$ [NOTOK <1:N>])

PRIEN <1:N>≧(F5 [PRIDIS <1:N>])

POUT <1:N>≧(PRIEN <1:N>) . (DSTEN <1:N>)

POUT <1:N> is the output of the priority logic device 122. $F_3$ is a function producing NOTOK <1:N> where each bit 1:N is marked "not ok" if its is enabled by its corresponding DSTEN bit and if its OK bit is 0 indicating that the bit is erroneous or special. In this way, only bytes that are both enabled and erroneous (or special) are selected when determining the set of bytes valid for transfer. F4 is a facility implemented by priority selection logic, producing PRISDIS <1:N>, where if any bit is marked "not ok", this bit and all higher-order bits are marked "disabled". The lowest-order bit is Bit 1 and the highest-order bit is Bit N. F5 produces PRIEN <1:N> by inverting each bit, changing a disable to an enable and an enable to a disable . POUT <1:N> is a priority function wherein each bit of DSTEN <1:N> is logically ANDED with each bit set by resulting from $F_5$. Thus, POUT <1:N> represents a set of bytes that have been latched into the DATA OUT latch 112 and have been found to be valid for transfer by the OKLOGIC device 102.

For example, where DSTEN <1:N> is 0,1,1,1, OK <1:N> could be x,1,0,1, where x means bit 1 is undefined (since DSTEN says that it is not a valid bit and its value is irrelevant) and where bit 3 is "not ok". NOTOK <1:N> would then be 0,0,1,0. Bit 1 is "0" so that it does not interfere with the equation and bit 3 is marked. PRISDIS <1:N> is therefore 0,0,1,1. Bit 3 and all higher-order bits (here bit 4) are marked "disabled." PRIEN <1:N> becomes 1,1,0,0 which is the inversion of PRISDIS. POUT <1:N> is therefore 0,1,0,0.

The POUT <1:N> signal is input to each of a MOVED latch 124 and a WRITEN latch 126. The DOUTWR <1:N> signal output by the AND logic device 118 is used as a latch enable for each of the MOVED and WRITEN latches 124, 126, as illustrated in FIG. 3. As should be understood, the DOUTWR <1:N> signal is asserted each cycle during the time the OUTWRT signal is asserted by the state machine 32. In this manner, POUT <1:N> ifs latched into each of the MOVED and WRITEN latches once each memory cycle in synchronization with the corresponding bytes moved from the DATA IN latch 100 to the DATA OUT latch 112, as described above.

The values for the POUT <1:N> bits for each memory cycle are accumulated in the WRITEN latch 126 up to a write cycle to provide a WRITEN <1:N> output signal corresponding to the bytes accumulated in the DATA OUT latch 112. The WRITEN <1:N> output is coupled to a byte enable input of the DRAM 14 so that only those bytes output by the DATA OUT latch 112 for which a bit is set in the WRITEN <1:N> signal will be overwritten during the write portion of a write cycle.

Thus, the generation of the OK <1:N> and POUT <1:N> signals can proceed in parallel to the generation and assertion of the DOUTWR <1:N> signal, and need not become stable until new data of a read cycle becomes stable in the DATA IN latch 100 or the commencement of the write portion of a write cycle, as described above. This provides adequate time for data check operation to proceed in parallel to the moving of data through the DMA controller 18 and to the DRAM 14. Bytes can be moved to the DATA OUT latch 112 before the WRITEN signal becomes stable. The bytes output by the DATA OUT latch 112 are later validated by the WRITEN <1:N> signal during the actual write of the data into the DRAM 14. The WRITEN latch 126 is cleared after each write cycle to permit the accumulation of WRITEN <1:N> bits for a next write cycle.

The POUT <1:N> signal is output from the MOVED latch 124 in a MOVED <1:N> signal that is input to an encoder 128. The encoder 128 examines the MOVED <1:N> signal and generates the NMOV <B:0> value to reflect the number of valid bytes moved from the DATA IN latch 100 to the DATA OUT latch 112 during each memory cycle. As described above, the NMOV <B:0> value is used to update the source and destination addresses and byte count number stored in the registers 24, 26, 28, respectively. The MOVED latch 124 is cleared after each memory cycle so that NMOV <B:0> reflects the number of bytes moved during a particular cycle.

As illustrated in FIG. 3, the priority logic device 122 also provides a check output. The check output is coupled to the CPU 16 and is asserted by the priority logic device 122 whenever a byte is found to have a parity error or be of a "special" character, etc. The CPU 16 can then proceed to examine the byte next highest to the highest byte actually written to the DRAM 14 by making use of the final value of the source register 24 and take appropriate error correction or character handling actions.

The operation of the DMA controller 118 will now be explained with reference to the timing diagram of FIG. 4. The OUTWRT pulse (and accordingly, the DOUTWR <1:N> signal via the AND logic device 118) is asserted once during each cycle, both read and write. The signal is asserted early enough in each cycle so that data can be moved from the DATA IN latch 100 to the DATA OUT latch 112 during both read and write cycles to maximize data throughput.

Figure 4:
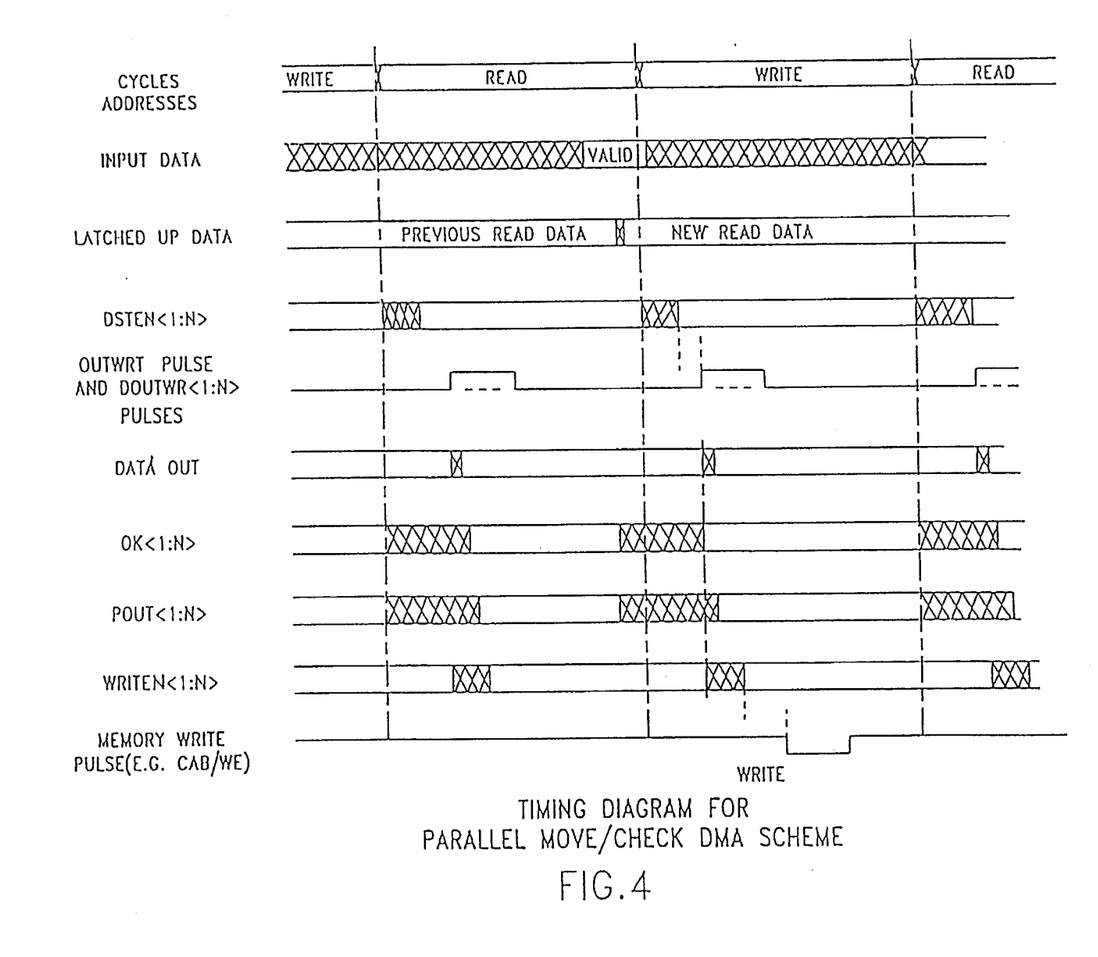
FIG. 4 is a general timing diagram for the data mover/checker device of FIG. 3.

As illustrated in FIG. 4, the OUTWRT pulse is asserted in a read cycle before the new read data becomes valid so that any offset byte(s) from a previous read cycle can be moved to the DATA OUT latch 112 during the current read cycle (under the control of DOUTWRT <1:N>, as determined by SRCENABLE and DSTENABLE during that read cycle). Again, the OUTWRT pulse is asserted in a write cycle before the write pulse is asserted so that available bytes from the new read data (under the control of DOUTWRT <1:N>, as determined by SRCENABLE and DSTENABLE during that write cycle) of the just completed read cycle can also be latched into the DATA OUT latch 112. Thus, bytes are accumulated in the DATOUT latch 112 during successive read/write cycles before the write pulse of the write cycle, and are written together to the DRAM 14 when the write pulse is asserted.

The OK <1:N>, POUT <1:N> and WRITEN <1:N> signals can become stable at any time during a read cycle until the new read data become valid or during a write cycle prior to assertion of the WRITE pulse. The DOUTWR <1:N> pulse and OUTWRT pulse can be asserted to move bytes during a memory cycle irrespective of the settling of the OK <1:N>, POUT <1:N> and WRITEN <1:N> signals since the data moved to and output by the DATA OUT latch 112 need only be validated for writing at the DRAM 14 during the assertion of the WRITE pulse, by which time the WRITEN <1:N> signal will have become stable.

The use of the MOVED and WRITEN Latches 124, 126 provides additional time for parallel byte checking while providing a mechanism to track the number of bytes moved for updating SRC, DST and CNT values and to accumulate enabled WRITEN bits for control of which bytes from the DATA OUT latch 112 are to be written into the DRAM 14 during a write cycle.

In our longword example, during a first read cycle, DSTEN <1:N> would be set to 0,0,0,0 since it would be a first longword read and there are no bytes presently in the DATA OUT latch 100. During the next write cycle, only three bytes from the longword aligned four bytes (SRC <m:0> is 0:0) that become valid as input data are available for moving to the 0:1, 1:0 and 1:1 locations of the DATA OUT latch 112 (DST <m:0> is 0:1). Thus, SRCENABLE and DSTENABLE operate to set DSTEN <1:N> to 0,1,1,1,. Of course, the one byte offset is loaded into the shift control device 110 to Control the cross-bar switching multiplexer 104. As this shift is a constant value during the direct memory access process, it is convenient to calculate it once and latch it before operations commence.

When the OUTWRT pulse is asserted during the write cycle, the DOUTWR <1:N> signal will be 0,1,1,1. In the next read cycle, the updated values for SRC <m:0> and DST <1:0> (NMOV equals 0,1,1), cause DOUTWR <1:N> to be 1,0,0,0, to latch the fourth byte stored in the DATA IN latch 100 into location 0,0 of the DATA OUT latch 112, before the new read data become stable in the DATA IN latch 100. The available three bytes from the new read data are then moved from the DATA IN latch 100 to the DATA out latch 112 during the subsequent write cycle, before the assertion of the write pulse, and so on. The above example assumes that LT <N:1> indicates that more than four bytes remain in the data transfer.

Accordingly, in most instances, four bytes can be shifted and moved, from offset source and destination addresses, in successive read/write cycles. An exception to successive read/write cycles can occur during the first several and last several memory cycles, for certain offsets. For example, when SRC <m:0> is offset from a longword boundary (i.e. less than four bytes are to be transferred from the first longword read from the DRAM 14), two successive read cycles are performed at the beginning of the data transfer to read and load four bytes into the DATA OUT latch 112.

Similarly, two successive write cycles are performed at the end of the data transfer to complete a data transfer to a non-longword aligned destination address. In our longword example, the destination address is offset by one byte from a longword boundary (DST <m:0> is 0:1). Thus, at the end of the data transfer, the last byte of the last longword read from the DRAM 14 must be written into location 0:0 of the next longword location to complete the transfer. A first write cycle transfers the first three bytes of the last longword and an immediate subsequent write cycle transfers the last byte.

The read/write control state machine 32 stores information on the offset between the source and destination addresses and operates to repeat read and/or write cycles at the beginning or end of a data transfer, when the offset information indicates repeat cycles are necessary to achieve a complete transfer of the X bytes. The state machine 32 can also be designed to not assert the OUTWRT pulse during certain memory cycles. For example, the control state machine 32 can implement the special function for SRC <m:0> equal to 0:0 by not asserting the OUTWRT pulse in the first read cycle following a write cycle when their is no offset between the source and destination addresses, as described above.

Figure 5A:
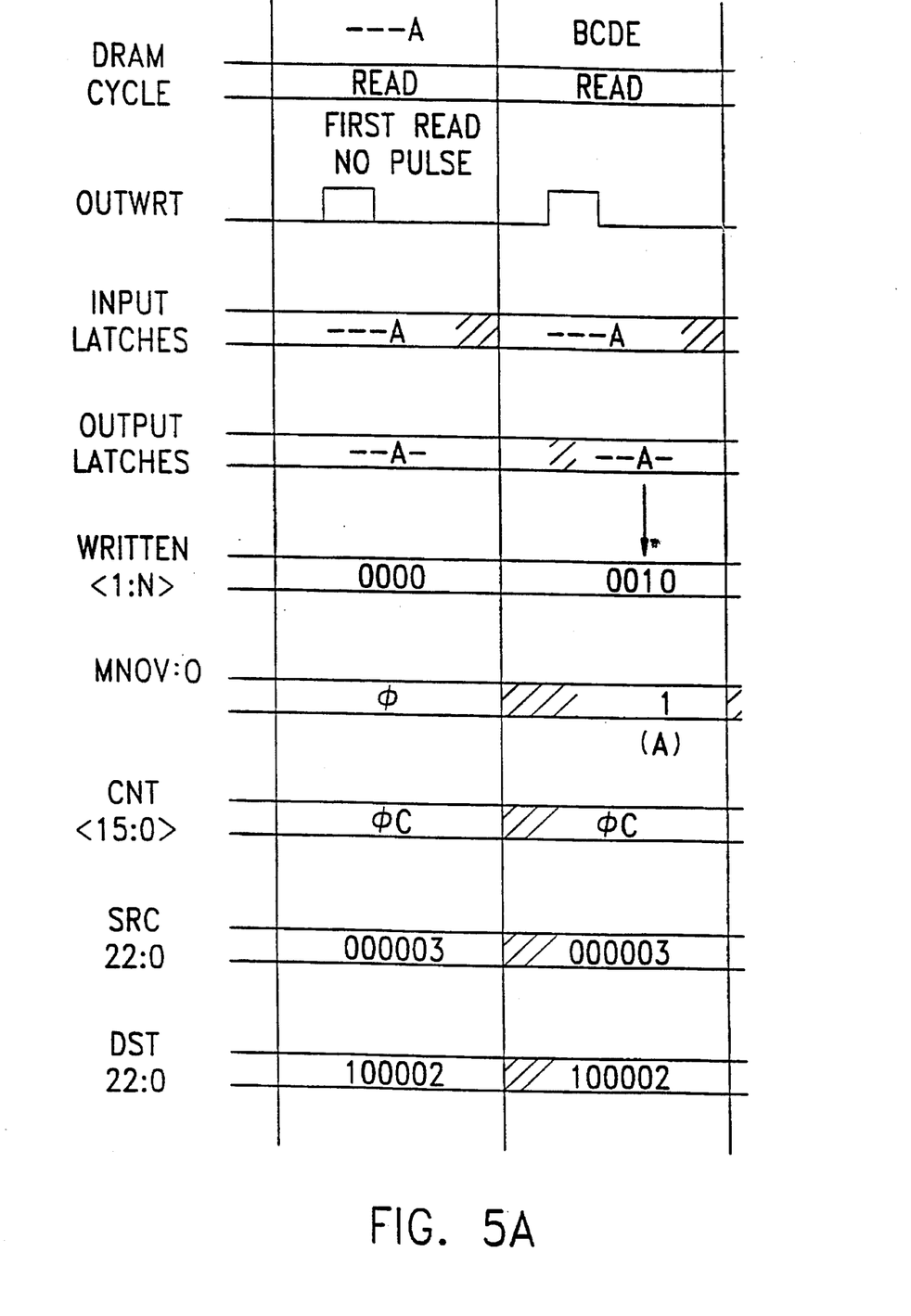
FIG. 5 is a timing diagram illustrating an example of a data transfer operation of the data mover/checker device of FIG. 3.
Figure 5B:
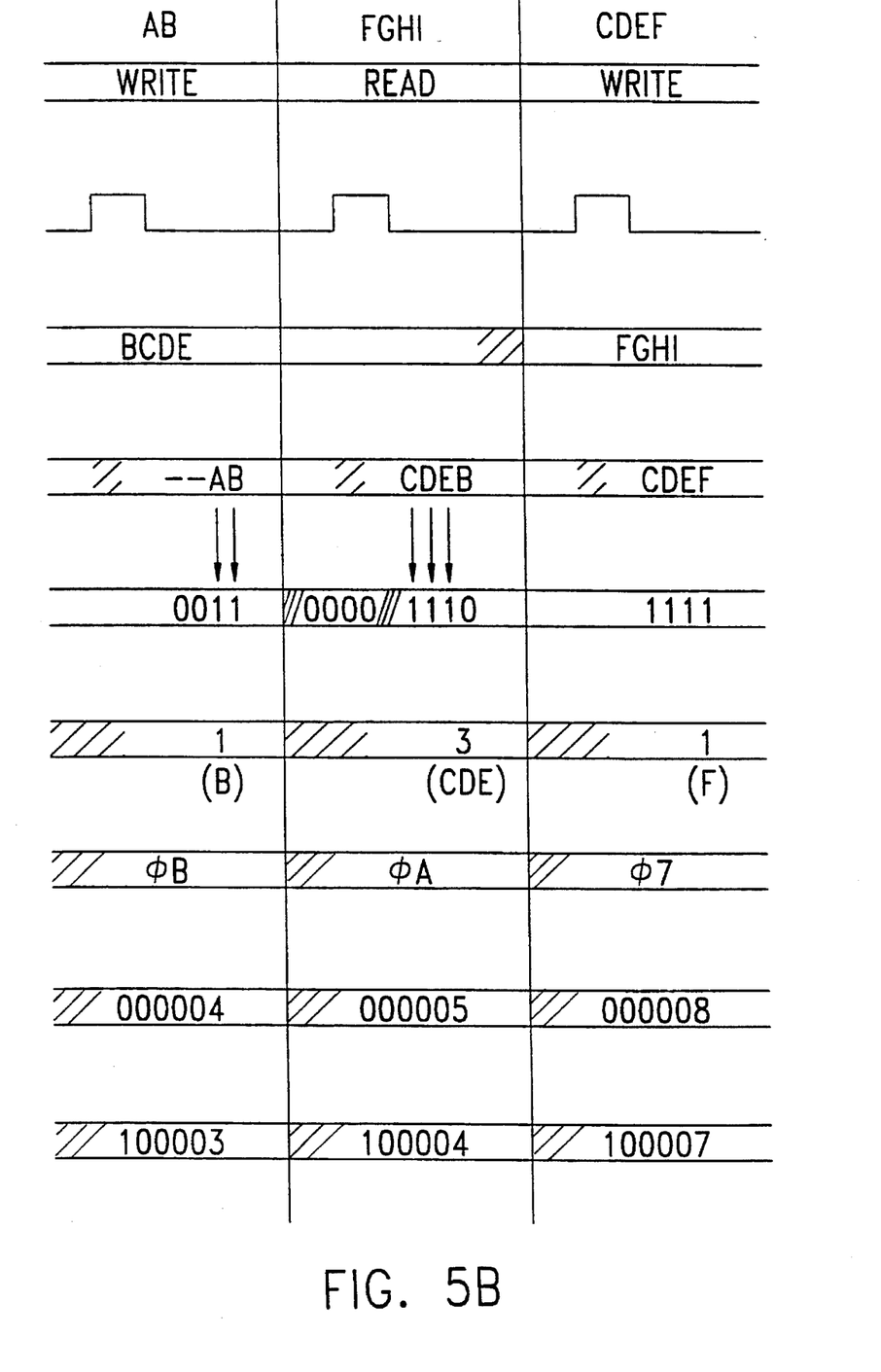
Figure 5C:
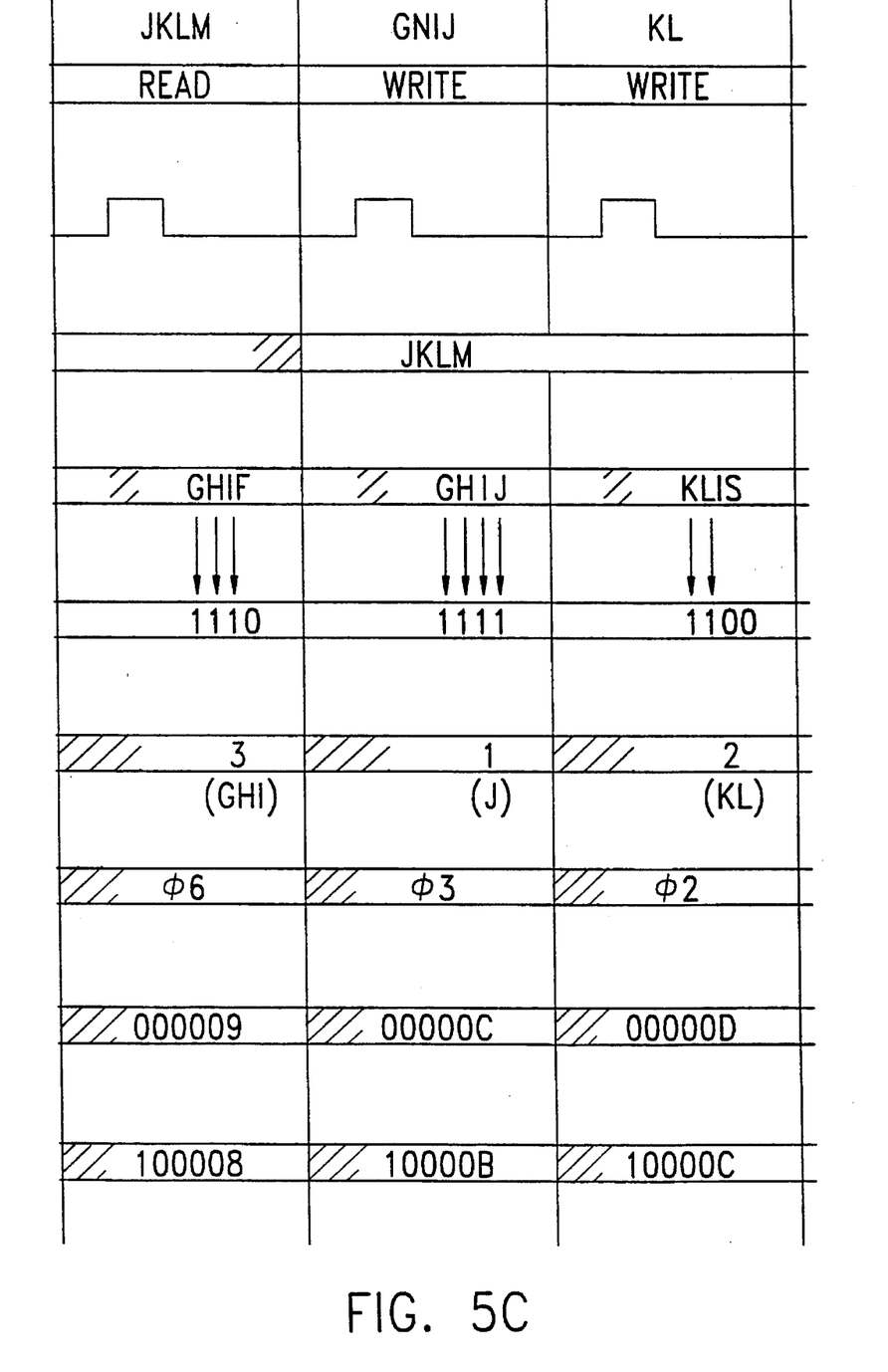

An additional example of a data transfer is fully illustrated in the timing diagram of FIG. 5. In the example, twelve bytes, designated A-L, are moved from an a DRAM location having an initial address of 000003 (hexadecimal) to a DRAM location having an initial address of 100002. The values for each of WRITEN <1:N>, NMOV, CNT <15:0>, SRC and DST, for each memory cycle, are indicated together with the designation for each of the bytes moved and/or written in respect of each of the DATA IN and DATA OUT latches during each of the respective cycles. The illustrated offset requires two successive read cycles and two successive write cycles at the beginning and end of the data transfer. Other than the successive read and/or write cycles required by certain offsets, the data transfer proceeds with alternate read/write cycles. The example also illustrates the non-assertion of the OUTWRT signal during the first read cycle. This is because there is no data to be moved from the DATA IN latch 100 to the DATA OUT latch 112 until the second read cycle.

The various combinational logic functions of the DMA controller can be made programmable to accommodate different endian schemes for the data. The above described representative embodiment is ordered as a byte-oriented big-endian scheme. In this scheme, the byte at the upper end of a 32 bit bus 20 (bits 31:24, corresponding to address bits 0:0) is the least significant byte, while the highest order byte is at the lower end of the bus (bits 7:0, corresponding to address bits 1:1).

Variations are possible within any endian scheme, such as a word-oriented big endian scheme. In a word-oriented big endian scheme, data bits 31:16 represented by address bit <1> equal to 0 is the least significant word. A little endian scheme uses the reverse order of bytes as in the byte-oriented big endian scheme. Thus, in a little endian bus, the least significant byte is at bits 7:0 at address bits 0:0. In a little endian scheme, the notation <1:N> is used to indicate that the lowest-order byte ("1") of the data bus is data bits 31:24 of a 32-bit bus and the highest order byte ("N") is bits 7:0.

In adapting to other endian schemes, the logic can simply alter the meaning of the address pointer bits. For example, with SRC <m:0> equal to 1:1 in a four byte bus implemented with a word-oriented big-endian scheme, means that two bytes are available from the source.

Moreover, the DMA controller can be implemented to transfer data from a memory coupled to a bus of a first size to a memory coupled to a bus of a second size. This is accomplished by matching the number of read cycles to write cycles so that the total number of bytes transferred are equal. For example, two sixteen bit reads can be performed for each 32-bit write, with additional reads or writes, as may be required by a particular offset.

The DMA controller can also be operated as a scanner by sequencing through a series of read cycles. Data is still moved from the DATA IN latch 100 to the DATA OUT latch 112 with byte checking performed as in the data transfer mode of operation. However, the data are not written to a destination location. As the destination is not of relevance, a shift of 0 is nominated. In that way, there are no undefined variables. DOUTWRT <1:N> is used to generate all N pulses, providing an opportunity to indicate bytes that are "OK" after the data check operation. The check signal is asserted by the mover/checker 38 whenever a byte is found to be not "OK". Thus, the DMA controller is readily convertible to perform a memory scanning function.

What is claimed is:

1. A direct memory access controller for transferring data from a source address to a destination address during a sequence of read and write memory cycles, the direct memory access controller comprising:

a DATA IN latch to receive data from the source address during a read memory cycle;

a DATA OUT latch to latch data through to the destination address during a write memory cycle;

a cross-bar switching mechanism coupling the DATA IN latch to the DATA OUT latch so that the data of the DATA IN latch are moved and shifted to the DATA OUT latch as a function of an offset between the source address and the destination address;

a combinational logic block arrangement arranged to receive the source address and the destination address and to generate a DATA OUT latch enable signal set during each read memory cycle and each write memory cycle to selectively enable a portion of the data received at the DATA IN latch into the DATA OUT latch as the function of the offset and the quantity of data to be transferred from the source address to the destination address;

an output-write-time signal generator operating to selectively assert an output-write-time signal once during each read memory cycle and once during each write memory cycle:
  i) before data received from the source address becomes stable in the DATA IN latch during the read memory cycle, and
  ii) before a write pulse portion of the write memory cycle; and
    a logic device arranged to receive as inputs the output-write-time signal and the DATA OUT latch enable signal and to output an active DATA OUT latch enable signal when the output-write-time signal is asserted by the output-write-time signal generator;
  the DATA OUT latch having a latch enable input coupled to the output of the logic device so that the portion of the data enabled by the active DATA OUT latch enable signal are latched into the DATA OUT latch when the output-write-time signal is asserted by the output-write-time signal generator.

2. The direct memory access controller of claim 1, further comprising:

an encoder coupled to the active DATA OUT latch enable output of the logic device to encode the portion of the data enabled by the active DATA OUT latch enable signal during the write memory cycle into a number representative of the quantity of data enabled by the active DATA OUT latch enable signal during the write memory cycle; and an incrementer mechanism coupled to the encoder and the combinational logic block arrangement to increment the source address and the destination address by the number and to input updated source address and destination address information to the combinational logic block arrangement for use in a subsequent memory cycle.

3. The direct memory access controller of claim 1, further comprising:

a data check device coupled to the the DATA IN latch to receive as data from the DATA IN latch and check the data for at least one preselected condition in parallel to movement of the data from the DATA IN latch to the DATA OUT latch and to generate a data check result output signal to indicate check results for each portion of data enabled by the active DATA OUT latch enable signal; and a priority logic device arranged to receive as inputs the DATA OUT latch enable signal and the data check result output signal and to generate as an output, a write enable signal output representative of the portion of data enabled by the active DATA OUT latch enable signal and have a positive indication in the data check result output signal;

the write enable signal output being adapted for coupling to a write enable input of a memory device containing the destination address.

4. The direct memory access controller of claim 3, wherein the data check result signal becomes stable:

i) in the read memory cycle, before data received from the source address becomes stable, and ii) in the write memory cycle, before the write pulse portion of the write memory cycle.

5. The direct memory access controller of claim 3, wherein the write enable output signal is generated during each of the read memory cycle and the write memory cycle and further comprising a write enable latch coupled to the write enable output signal of the priority logic device to receive the write enable output signal during each of the read memory cycle and the write memory cycle, the write enable latch having an enable input coupled to the logic device output of the active DATA OUT latch enable signal to latch and accumulate the write enable output signal through successive ones of each of the read memory cycle and the write memory cycle up to one of the write memory cycle.

6. The direct memory access controller of claim 2, further comprising:

a count decrement mechanism coupled to the encoder and to the combinational logic block arrangement to decrement by a number an amount of data to be transferred and decode the number into amount of data remaining information for input to the combinational logic block arrangement to control generating the DATA OUT latch enable signal.

7. The direct memory access controller of claim 6, wherein the combinational logic block arrangement comprises a source-enable combinational logic block and a destination-enable combinational logic block and wherein:

the source-enable combinational logic block receives as inputs data remaining information and source address information and modifies the data remaining information by the portion of data potentially available, as indicated by the source address information, to generate an output signal representative of which of the portion of read data from the source address that are potentially writable to the destination address, and the destination-enable combinational logic block receives as inputs the output signal of the source-enable combinational logic block and destination address information to generate the DATA OUT latch enable signal as a function of the output signal and the portion of data that are potentially writable to the destination address, as indicated by the destination address information.

8. The direct memory access controller of claim 3, wherein the data check device is arranged to output a check signal whenever any portion of the data receives a negative indication in the data check result output signal.

* * * * *